(12) United States Patent
Keister (10) Patent No.: US 9,221,697 B2
(45) Date of Patent: Dec. 29, 2015

(54) TREATMENT OF GAS WELL HYDROFRACTURE WASTEWATERS

(71) Applicant: ProChemTech International, Inc., Brockway, PA (US)

(72) Inventor: Timothy Edward Keister, Brockway, PA (US)

(73) Assignee: ProChemTech International, Inc., Brockway, PA (US)

( * ) Notice: Subject to any disclaimer, the term of this patent is extended or adjusted under 35 U.S.C. 154(b) by 64 days.

(21) Appl. No.: 14/294,953

(22) Filed: Jun. 3, 2014

(65) Prior Publication Data

US 2014/0286854 A1 Sep. 25, 2014

Related U.S. Application Data

(62) Division of application No. 12/620,019, filed on Nov. 17, 2009, now Pat. No. 8,834,726.

(60) Provisional application No. 61/199,588, filed on Nov. 19, 2008.

(51) Int. Cl.
| | |
|---|---|
| C02F 1/52 | (2006.01) |
| C02F 1/66 | (2006.01) |
| E21B 43/40 | (2006.01) |
| C02F 1/62 | (2006.01) |
| C02F 1/56 | (2006.01) |
| E21B 21/06 | (2006.01) |
| C01B 5/00 | (2006.01) |
| C02F 103/36 | (2006.01) |
| C02F 11/12 | (2006.01) |

(52) U.S. Cl.
CPC ............... *C02F 1/5236* (2013.01); *C01B 5/00* (2013.01); *C02F 1/56* (2013.01); *C02F 1/62* (2013.01); *C02F 1/66* (2013.01); *E21B 21/068* (2013.01); *E21B 43/40* (2013.01); *C02F 11/122* (2013.01); *C02F 2103/365* (2013.01); *Y10S 210/919* (2013.01)

(58) Field of Classification Search
CPC ............ C02F 1/5236; C02F 1/62; C02F 1/56; C02F 1/66; C02F 2103/365; C02F 11/12; C01B 5/00; E21B 43/40; E21B 21/068; Y10S 210/919
See application file for complete search history.

(56) References Cited

U.S. PATENT DOCUMENTS

| | | |
|---|---|---|
| 3,420,775 A | 1/1969 | Cadwallader |
| 4,444,675 A | 4/1984 | Goeldner |
| 4,563,283 A | 1/1986 | Nicksic |
| 4,648,333 A | 3/1987 | Mudd et al. |
| 4,895,665 A | 1/1990 | Colelli et al. |
| 5,011,610 A | 4/1991 | Martin et al. |
| 5,262,063 A | 11/1993 | Yen |
| 5,266,210 A | 11/1993 | McLaughlin |
| 5,422,012 A | 6/1995 | Adams |
| 5,879,563 A | 3/1999 | Garbutt |

(Continued)

*Primary Examiner* — David C Mellon
(74) *Attorney, Agent, or Firm* — Kilyk & Bowersox, P.L.L.C.

(57) ABSTRACT

Discharge water from a coal mine, and/or water from an abandoned coal mine, is used as a source of sulfate ions to precipitate barium from gas well hydrofracture wastewater. A liquid comprising a gas well hydrofracture wastewater comprising barium is mixed with a coal mine water comprising sulfate ions. The amount of coal mine water in the liquid is sufficient to provide enough sulfate ions to precipitate at least 90% of the barium in the gas well hydrofracture wastewater. The ratio of gas well hydrofracture wastewater to coal mine water can be from 1:10 to 1:1.

18 Claims, 8 Drawing Sheets

(56) References Cited

U.S. PATENT DOCUMENTS

| | | |
|---|---|---|
| 6,113,797 A | 9/2000 | Al-Samadi |
| 6,932,909 B2 | 8/2005 | Rey |
| 7,244,361 B2 | 7/2007 | Dwyer |
| 7,255,793 B2 | 8/2007 | Cort |
| 7,261,820 B2 | 8/2007 | Blakey et al. |
| 7,322,152 B2 | 1/2008 | Hill |
| 7,393,454 B2 | 7/2008 | Basset et al. |
| 7,438,142 B2 | 10/2008 | Butler et al. |
| 7,497,954 B2 | 3/2009 | Ivan et al. |
| 7,520,342 B2 | 4/2009 | Butler et al. |
| 7,527,736 B2 | 5/2009 | Shafer et al. |
| 7,608,190 B1 | 10/2009 | Banerjee et al. |
| 7,681,643 B2 | 3/2010 | Heins |
| 7,815,804 B2 | 10/2010 | Nagghappan |
| 7,824,552 B2 | 11/2010 | Slabaugh et al. |
| 2009/0184054 A1 | 7/2009 | Crawford et al. |
| 2009/0261042 A1 | 10/2009 | Semiat et al. |
| 2010/0125044 A1 | 5/2010 | Keister |

TREATMENT OF GAS WELL HYDROFRACTURE WASTEWATERS

CROSS-REFERENCE TO RELATED APPLICATIONS

The present application is a divisional of U.S. patent application Ser. No. 12/620,019, filed Nov. 17, 2009, now U.S. Pat. No. 8,834,726 B2, issued Sep. 16, 2014, which in turn claims benefit under 35 U.S.C. §119(e) from earlier filed U.S. Provisional Application No. 61/199,588, filed Nov. 19, 2008, both of which are herein incorporated by reference in their entireties.

FIELD

The present teachings relate to methods for treating wastewater, and more specifically, methods for treating gas well hydrofracture wastewaters.

BACKGROUND

While various individual methods are available for addressing specific constituents of gas well wastewaters and for treatment of abandoned coal mine acid drainage (AMD), there exists no process to treat, or co-treat, such wastewaters in a manner that renders such wastewaters suitable for recycle.

The drilling of natural gas wells and subsequent on-going recovery and/or production of natural gas produces a number of wastewater streams commonly identified as completion, hydrofracture flowback, and production waters. Drilling of a gas well also requires a substantial amount of water for makeup of the virgin, prior to use, drilling muds, completion, and hydrofracture waters. It is estimated that a typical deep horizontal gas well requires from 1 to 3 million gallons of water for completion/hydrofracture and generates an equal amount of hydrofracture flowback and production wastewaters.

With significant new large drilling activities linked to tight gas shale formations such as the Marcellus Shale in Pennsylvania, the provision of sufficient water for new drilling activities and subsequent disposal of large volumes of wastewater has become a critical issue. The wastewaters produced by gas well drilling, completion, and production activities present some unusual and difficult problems with regard to treatment suitable to enable disposal by discharge to surface waters.

Recent disposal activities have included co-treatment in publicly owned treatment plants (POTW), the use of industrial treatment systems, and the use of a limited number of purpose built treatment plants. These methods of disposal all treat and discharge treated wastewater to surface waters but are capable of removing only a limited number and amount of the pollutants typically present. POTW are limited in that the amount of wastewater that can be treated is limited by the barium content, which can affect the production of a sludge characterized as a hazardous waste. Other processes are limited in that they cannot obtain a substantial reduction in dissolved solids.

In 2008, the Monongahela River in Western Pennsylvania experienced a rapid rise in dissolved solids content which severely disrupted many public water supplies and industrial operations. The cause was found to be the discharge of gas well wastewaters treated by many POTW situated along the river.

The regulatory agency, Pennsylvania Department of Environmental Protection, (PADEP) subsequently placed a very restrictive limit of 500 mg/l on dissolved solids discharges to surface waters resulting from treatment of gas well wastewaters. This limit goes into effect on Jan. 1, 2011, for all new dischargers with a starting discharge date of Apr. 11, 2009.

Table 1 below shows analytical data on a typical hydrofracture flowback wastewater. As can be seen, it is extremely high in dissolved solids, toxic barium, and scale formers such as calcium, iron, magnesium, and strontium.

TABLE 1

| Parameter | Analytical Result |
| --- | --- |
| conductivity - mmhos | 152,000 |
| dissolved solids - mg/l | 175,268 |
| total suspended solids - mg/l | 416 |
| biological oxygen demand, 5 day - mg/l | 489 |
| methyl blue active substances - mg/l | 0.939 |
| chloride - mg/l | 73,370 |
| oil/grease - mg/l | 38 |
| total organic carbon - mg/l | 114.5 |
| ammonia-N -mg/l | 83.5 |
| chemical oxygen demand - mg/l | 600 |
| total hardness - mg/l | 39,100 |
| strontium - mg/l | 6,830 |
| barium - mg/l | 3,310 |
| calcium - mg/l | 14,100 |
| iron - mg/l | 52.5 |
| magnesium - mg/l | 938 |
| manganese - mg/l | 5.17 |

In addition to these major constituents, low levels of copper, nickel, zinc, lead, and other assorted heavy metals are also reported.

The only known technology for treatment of such a wastewater to meet the impending PADEP dissolved solids limit for surface water discharge is evaporation. Prior to evaporation, the toxic barium would have to be removed to prevent the resultant dry salt cake from being a hazardous waste while the scale formers calcium, magnesium, iron, and strontium would have to be removed to prevent scale formation on heat transfer surfaces.

An alternative to trying to treat for surface water discharge, or pretreat and evaporate, would be to treat the wastewater for recycle as hydrofracture makeup water. From various sources in the gas well hydrofracture service industry, it appears that the specific parameters shown in Table 2 below would be required of water to be used for makeup of hydrofracture water.

TABLE 2

| Parameter | Recommended Values |
| --- | --- |
| Scale Ions - aluminum, barium, calcium, iron, magnesium, manganese, and strontium | maximum of 2,500 mg/l as CaCO3 |
| Dissolved Solids | maximum of 50,000 mg/l |
| Iron | maximum of 20 mg/l |
| Suspended Solids | none |
| Calcium | maximum 350 mg/l as CaCO3 |

The makeup water would need to be substantially free of microorganisms to prevent growth of microorganisms in the fractured gas bearing strata.

SUMMARY

According to various embodiments of the present teachings, a process for treatment of hydrofracture wastewaters, for example, flowback water, is provided to meet the specific parameters discussed above. The method is suitable for either direct reuse or for reuse following addition of low dissolved solids waters. Furthermore, to address concerns as to depletion of the fresh water supply in the Marcellus shale development area, the present teachings provide for the co-treatment of flowback hydrofracture water with abandoned coal mine acid drainage (AMD). Such co-treatment puts to good use a polluted water source and provides for reduction of the dissolved solids content in the treated water.

According to various embodiments of the present teachings, a method of treating a wastewater is provided that comprises contacting a metal-containing wastewater with a source of sulfate ions and precipitating metal compounds from the wastewater in the form of one or more metal sulfates. For example, barium can be removed as barium sulfate. The one or more metal sulfates can then be removed from the stream of wastewater to form a first treated wastewater. The first treated wastewater can then be contacted with a source of carbonate ions and the method can comprise precipitating one or more metal carbonates from the treated wastewater after contact with the source of carbonate ions. The resultant mixture can comprise a second treated wastewater and one or more metal carbonates. The mixture can then be contacted with a source of hydroxide ions and the method can comprise precipitating one or more metal hydroxides from the second treated wastewater. In some embodiments, the method can further comprise removing precipitated metal carbonates from the mixture, for example, removing calcium carbonate, strontium carbonate, strontium hydroxide, and magnesium hydroxide.

According to various embodiments of the present teachings, after metal-containing wastewater is contacted with a source of sulfate ions, the resulting wastewater can be contacted with an anionic polymer in an amount sufficient to flocculate one or more metal sulfates. The metal sulfates can then be removed from the wastewater. In some embodiments, the metal-containing wastewater can comprise barium and the process can comprise producing one or more barium sulfates that can then be removed from the wastewater. Sufficient sulfate ions can be used to precipitate at least 90% of the barium from the metal-containing wastewater. In some embodiments, the method can further comprise contacting a mixture of treated wastewater and one or more metal carbonates with a source of carbonate ions.

According to various embodiments, the method can comprise filtering metal sulfates, metal carbonates, and metal hydroxides out of a wastewater, for example, by using a filter press. After metal compounds are removed from the wastewater, the wastewater can be recycled, for example, by being pumped into a gas well hydrofracture. The metals that can be removed according to various embodiments of the present teachings, include barium sulfate, calcium carbonate, strontium carbonate, magnesium hydroxide, and strontium hydroxide. The metals can be removed in the form of metal sludge cakes formed by a filter press.

According to various embodiments of the present teachings, the method can use, as a source of sulfate ions, a discharge stream from a coal mine or water from an abandoned coal mine. In some embodiments, a method is provided whereby a liquid comprising abandoned coal mine water and gas well hydrofracture wastewater is disposed in a gas well hydrofracture.

BRIEF DESCRIPTION OF THE DRAWINGS

The present teachings will be exemplified with reference to the attached drawing figures which are intended to illustrate, and not limit, the scope of the present teachings.

DETAILED DESCRIPTION

The present teachings relate to a process, system, equipment, and chemical reactions for treatment, and co-treatment with AMD, of gas well wastewaters from completion, hydrofracture, and production. According to various embodiments, the majority of gas well wastewater to be treated is hydrofracture fracture flowback water. This wastewater is produced when water is mixed with fine sand and various additives to reduce its viscosity and injected into underground gas producing formations to crack them. The hydrofracture water is removed from the formation following the fracture process to permit gas production and recovery.

Cracking of the gas bearing formation is required to allow gas to escape to the drilled well. The sand remains in the formation to keep the cracks produced by the high pressure water open after the pressure is released and the water removed. The removed water, often 1 to 3 million gallons per well, is hydrofracture wastewater that can be treated according to the present teachings. Due to the various additives added to specific hydrofracture water and the differences in the formations treated, the types and amounts of constituents present in the fracture wastewater can vary substantially. In addition to the hydrofracture water, wastewaters from completion and production also result from operation of a gas production well and also show wide variations in chemical composition. As these wastewaters are similar to hydrofracture water, the present teachings also provide for their treatment, and the term "hydrofracture wastewater" is considered herein to be inclusive of both completion and production wastewaters as well as hydrofracture wastewaters.

To recycle gas well hydrofracture wastewaters as hydrofracture makeup water, the water must be free of suspended solids, microorganisms, and scale forming constituents. As shown in the typical analysis provided in TABLE 1 above, hydrofracture wastewater has a high suspended solids, high organic (BOD/COD/TOC) loading, and high levels of such scale forming constituents as barium, calcium, iron, magnesium, manganese, and strontium. Barium is also toxic, which requires that it be treated in a manner to avoid production of a toxic sludge.

According to the present teachings, a process is provided that removes suspended solids, controls microorganisms, removes toxic barium as a non-toxic sludge, and removes scale-forming constituents from hydrofracture wastewater, and in some embodiments removes such components to levels rendering the treated wastewater suitable for recycle as hydrofracture makeup water. The process begins with equalization and aeration of wastewater to obtain an aerobic, uniform stream for continuous treatment at a flow of from 5 gallons per minutes (gpm) to 2000 gpm, or more, for example, from 5 gpm to 1000 gpm, from 5 gpm to 500 gpm, or from 50 gpm to 200 gpm. The process can be operated as a fixed site installation or trailer-mounted for mobile use at a gas well drilling site.

For co-treatment with AMD, hydrofracture wastewater is mixed with the AMD at a ratio of from 1:10 to 1:1, for example, a ratio of from 1:3 to 1:4, as the two wastewaters enter the first process step. AMD often contains substantial amounts of sulfate ion which reduces the amount of sulfate ion needed to precipitate barium. In some embodiments, the first process step comprises using sulfate ions in an acidic, oxidizing environment to target and precipitate just barium. Second and third process steps can be provided to target calcium, strontium, and magnesium.

In some embodiments, the process begins with pumping hydrofracture wastewater at a constant desired or design flow rate from an aerated equalization tank to a first process tank. The contents of the first process tank are strongly mixed and retained for a retention time of at least 5 minutes at the design flow rate of the system. Controlled additions of an oxidant, pH adjusters, and precipitants can be made to the wastewater in this first process step. Potassium permanganate solution, for example, at about 5% by weight, can be added as an oxidizer to obtain a faint pink color in the wastewater indicating that all readily oxidized constituents have been oxidized. The wastewater is maintained at an optimum pH range of 3.0 to 3.5, for example, by automatically controlled addition of sulfuric acid. The sulfuric acid can be provided, for example, in a 50% by weight, or greater, solution, such as a 98% by weight aqueous solution. The amount of sulfate ions provided by the added sulfuric acid can be sufficient to provide total precipitation of the barium as barium sulfate, under these conditions.

In the event that insufficient sulfate ion is supplied by the sulfuric acid, further addition for complete barium removal, as indicated by control testing, can be accomplished by also adding sodium hydroxide to increase the pH, enabling the addition of more sulfuric acid to maintain the desired oxidizing and acidic reaction conditions.

In a second process step, hydrofracture wastewater can be made to flow by gravity to a second mix tank where it can be retained for a retention time of 5 minutes at the design flow rate of the system. Sodium hydroxide solution, for example, at a concentration of 50% by weight, can be added to raise the pH of the wastewater to the 7.0 to 7.5 range. The pH-adjusted wastewater can then be made to flow by gravity into an aerated equalization tank where it can be retained for a retention time of about 60 minutes.

From the first process equalization tank, the pH-adjusted wastewater can be pumped to a first chalked and gasketed plate and frame filter press at flow rates from twice to less than 10% of the design flow rate. In the pump line from the tank to the filter press, an anionic polymer can be added, or another flocculating agent. An exemplary flocculating polymer that can be added can comprise a diluted anionic polymer added to flocculate the precipitates produced in the previous two process steps. The polymer can be diluted to have a concentration of from 0.2% to 0.5% by weight. A suitable polymer is PCT 8712 available from ProChemTech International, Inc. of Brockway, Pa. The filter press can remove the precipitates, including barium sulfate and small amounts of other materials like iron and manganese, as a solid sludge cake comprising from 25% to 65% solids, for example, from 35% to 45% solids, or about 40% solids. Clear liquid can be discharged from the filter press into a second process equalization tank and retained there for a retention time of about 60 minutes. The resultant non-hazardous barium sulfate sludge cake is suitable, with further processing, for use as a drilling mud additive or as a component of glass batch.

From the second process equalization tank, the clear wastewater is pumped to a third mix tank and retained therein for a retention time of 5 minutes at the design flow rate of the system. Sodium carbonate can be automatically added to this tank as a dry powder, for example, using an auger, to raise the pH of the wastewater to the range of from 9.5 to 10.5. Under these reaction conditions calcium precipitates as calcium carbonate and a substantial portion of any strontium present precipitates as strontium carbonate. The pH-adjusted wastewater can then be made to flow by gravity into an aerated third equalization tank where it can be retained for a retention time of about 60 minutes.

From the third process equalization tank, the pH-adjusted wastewater can be pumped to a second chalked and gasketed plate and frame filter press at flow rates from twice to less than 10% of the design flow rate. In the pump line from the tank to the filter press, a diluted anionic polymer such as PCT 8712, for example, diluted to a concentration of from 0.2% to 0.5% by weight, can be added to flocculate the precipitates produced in the previous process step. The filter press can remove the precipitates, including mixed calcium and strontium carbonate, as a solid sludge cake comprising from 25% to 65% solids, for example, about 40% solids. Clear liquid can be discharged from the filter press into an aerated fourth process equalization tank where it can be retained for a retention time of about 60 minutes.

The mixed calcium/strontium carbonate sludge cake can be used as a soil amendment or as an alkaline additive for reclamation of acid mine spoil areas.

From the fourth process equalization tank, the clear wastewater can be pumped to a fourth mix tank where it is retained for a retention time of about 5 minutes at the design flow rate of the system. Sodium hydroxide solution, for example, at a concentration of about 50% by weight, can be automatically added to the fourth process equalization tank to raise the pH of the wastewater to be within the range of from 11.5 to 12.0. Under these reaction conditions magnesium precipitates as magnesium hydroxide and any remaining strontium precipitates as strontium hydroxide. The pH-adjusted wastewater can then be made to flow by gravity into an aerated fifth equalization tank where it can be retained for a retention time of about 60 minutes. The mixed magnesium/strontium hydroxide sludge cake can be used as a soil amendment or as an alkaline additive for reclamation of acid mine spoil areas.

From the fifth process equalization tank, the pH-adjusted wastewater can be pumped to a third chalked and gasketed plate and frame filter press at flow rates from twice to less than 10% of the design flow rate. In the pump line from the tank to the filter press, a diluted anionic polymer such as PCT 8712, for example, diluted to 0.2% to 0.5% by weight, can be added to flocculate the precipitates produced in the previous process step. The filter press can remove the precipitates, including mixed magnesium and strontium hydroxides, as a solid sludge cake comprising from about 25% to 65% solids, for example, about 40% solids. Clear liquid can be discharged from the filter press into a sixth process tank where it can be retained for a retention time of about 10 minutes.

In the sixth process tank, carbon dioxide gas can be automatically added via diffusers to the clear, treated wastewater to reduce its pH to the range of from 6.5 to 8.5. The pH-adjusted, clarified wastewater can then be discharged by gravity into clear water storage tanks for recycle as hydrofracture makedown water or for evaporation into a brine or salt.

According to various embodiments, an evaporation unit is provided to treat the wastewater resulting from the method of the present teachings described above. In some embodiments, a suitable evaporation unit is illustrated by evaporation unit 20 described herein with reference to FIGS. 1-6. As can be seen in FIGS. 1-6, evaporation unit 20 comprises a brine tank 22, an evaporation chamber 24, and a vapor return chamber 25. A sprayer assembly 26 is provided to spray a treated wastewater over and onto a heat transfer coil 34 to cause water in the treated wastewater to evaporate. Water vapor resulting from the evaporation process is removed from the evaporation unit 20 by exhaust fan units 28, 30, and 32. Exhaust fan units 28, 30, and 32 are driven by fan motors 29, 31, and 33, respectively.

Figure 1:
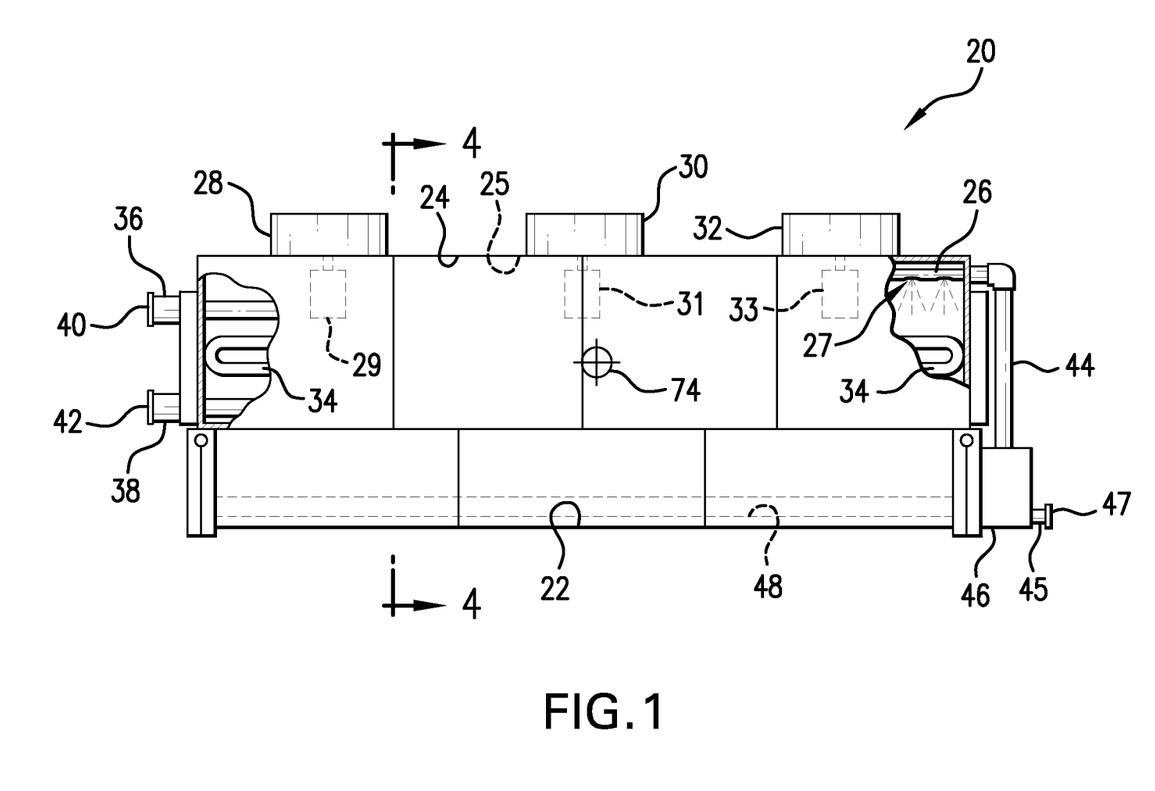
FIG. 1 is a side view of an evaporation unit according to various embodiments of the present teachings.

As shown in FIG. 1, heat transfer coil 34 is in fluid communication with a heat transfer fluid supply line 36 and a heat transfer return line 38. Flanges 40 and 42 can be provided to connect a heated fluid supply from an appropriate source to be brought into evaporation unit 20 and returned as cooled fluid. The heated fluid can comprise a heat exchange fluid from a heat exchange unit of a reactor or power plant. A chemical reactor, for example, can be used as a heated fluid supply for heat transfer coil 34. The heated fluid can advantageously be cooled by evaporation unit 20 and returned to its source. Thus, evaporation unit 20 can serve a dual propose of evaporating water from treated wastewater and cooling a heat exchange fluid from a reactor.

According to various embodiments, brine tank 22 can initially be filled with a treated wastewater that is supplied to brine tank 22 through a treated wastewater supply line 45. A flange 47 can be provided on treated wastewater supply line 45 to connect wastewater supply line 45 to a source of treated wastewater.

According to various embodiments, a pump 46 can pump treated wastewater from brine tank 22 through treated water supply line 44 to sprayer assembly 26. Sprayer assembly 26 can comprise a plurality or nozzles 27 through which treated wastewater can be sprayed onto heat transfer coil 34. Treated wastewater that is not evaporated on heat transfer coil 34 can drip down by gravity back into brine tank 22 where it can be returned to pump 46 through a treated water and brine return line 48. As the cycle can be continuous, the concentration of salt in the treated wastewater in brine tank 22 increases as evaporation occurs. A hydrometer can be provided to test the salt content of the brine. Precipitated salt can be periodically removed. The brine and/or salt can be used, for example, to treat road surfaces. Brine can be further evaporated, for example, on a cement pad, until the liquid evaporates and only a salt remains.

Figure 2:
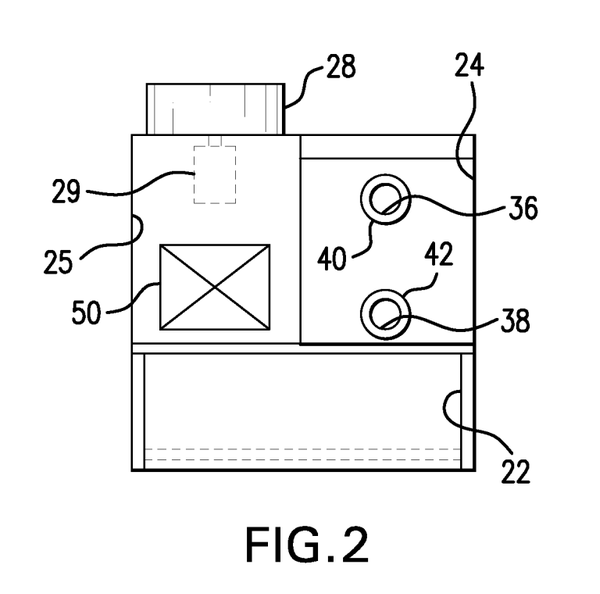
FIG. 2 is a left side view of the evaporation unit shown in FIG. 1.

Viewing FIG. 1 as a side view of evaporation unit 20, FIG. 2 is a left side view of evaporation unit 20. As shown in FIG. 2, an access panel 50 can be provided to access vapor return chamber 25.

Figure 3:
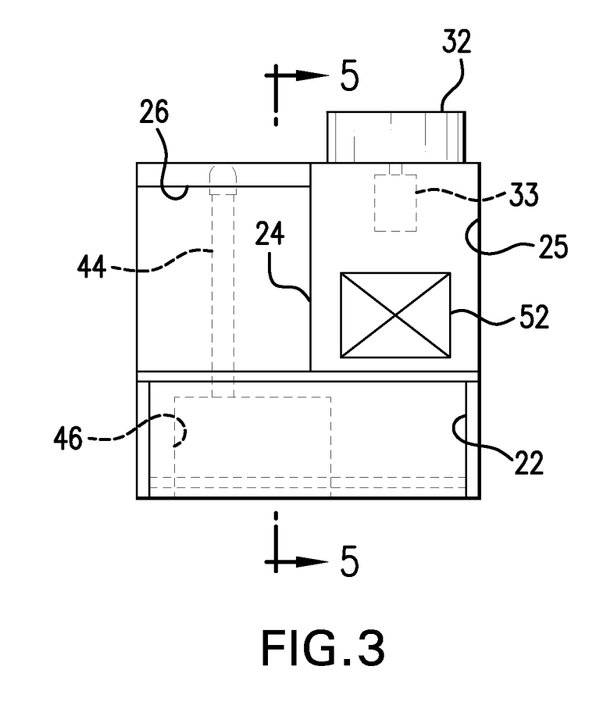
FIG. 3 is a right side view of the evaporation unit shown in FIG. 1.

FIG. 3 is a right side view of evaporation unit 20 shown in FIG. 1. As shown in FIG. 3, an access panel 52 can be provided to enable access to vapor return chamber 25.

Figure 4:
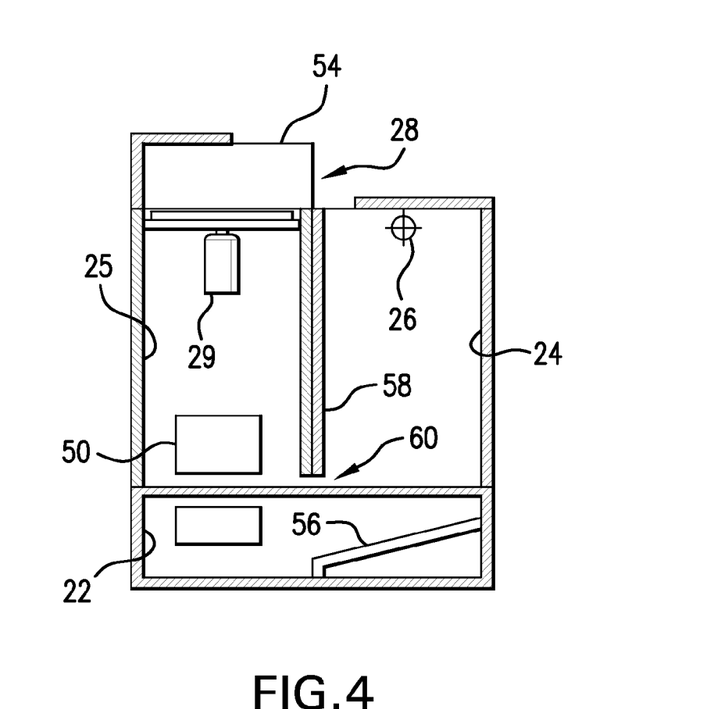
FIG. 4 is a cutaway view of the evaporation unit shown in FIGS. 1-3, taken along line 4-4 shown in FIG. 1.

FIG. 4 is a cutaway side view of evaporation unit 20, taken along line 4-4 of FIG. 1. As can be seen in FIG. 4, exhaust fan unit 28 comprises a fan shield 54. FIG. 4 also shows that brine tank 22 can be provided with a sloped bottom 56 below evaporation chamber 24. FIG. 4 also shows an intermediate wall 58 formed between evaporation chamber 24 and vapor return chamber 25. Intermediate wall 58 extends downwardly from the top of evaporation unit 20 toward the top of brine tank 22, but ends above brine tank 22 such that a vapor passage 60 is provided between evaporation chamber 24 and vapor return chamber 25.

Figure 5:
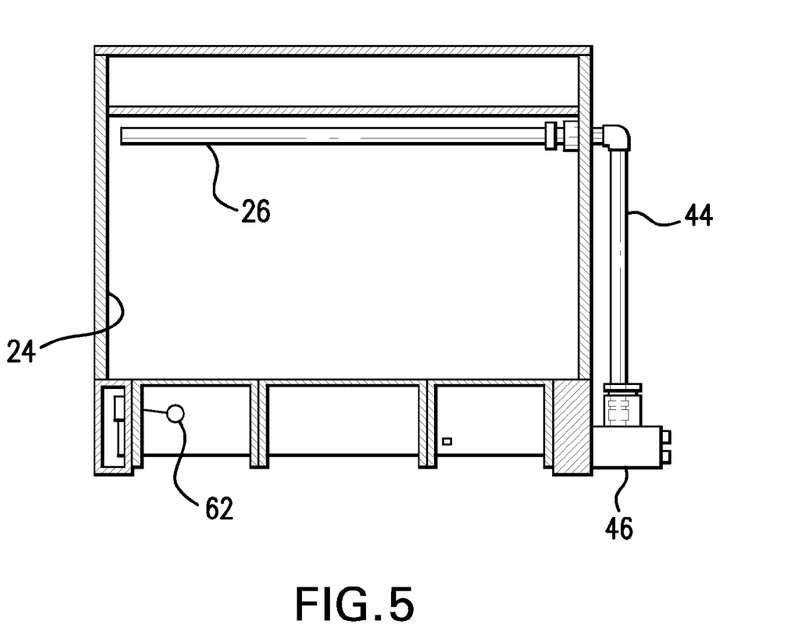
FIG. 5 is a cutaway view of the evaporation unit shown in FIGS. 1-4, taken along line 5-5 shown in FIG. 3.

FIG. 5 is a cutaway view taken along line 5-5 of FIG. 3, and shows the inside of evaporation unit 24 with heat transfer coil 34 removed. As can be seen in FIG. 5, a float valve 62 can be provided to maintain a maximum height of treated wastewater and/or brine in brine tank 22.

Figure 6:
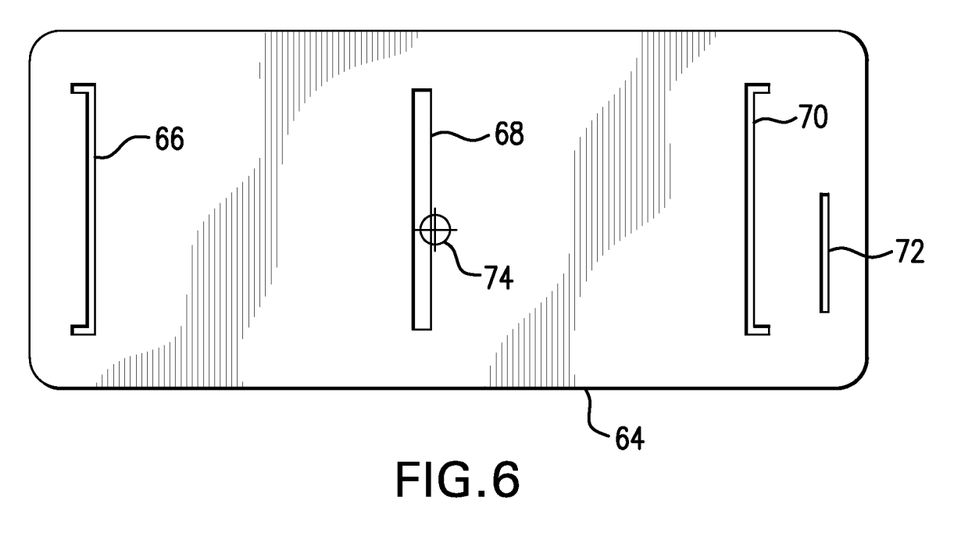
FIG. 6 is a top view of a pad and support brackets that can be used to support the evaporation unit shown in FIGS. 1-5.

FIG. 6 is a top view of a pad 64, such as a concrete pad, onto which support brackets can be mounted or integrally formed for the purpose of supporting evaporation unit 20. As seen in FIG. 6, support brackets 66, 68, 70, and 72 are provided. A centering point 74 is also shown in FIG. 6 and is designed to be centered below centering point 74 shown in FIG. 1 when evaporation unit 20 is placed on pad 64.

Figure 7:
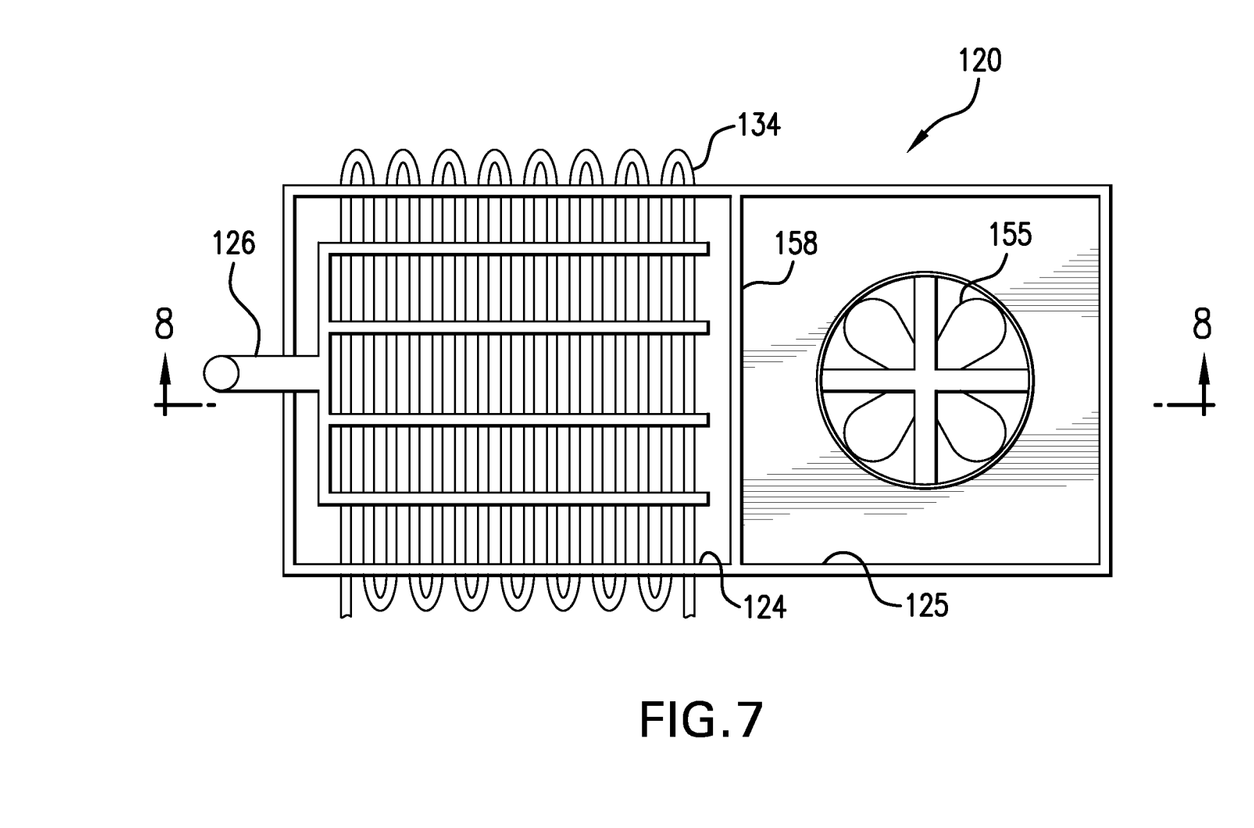
FIG. 7 is a top view of an evaporation unit according to another embodiment of the present teachings.
Figure 8:
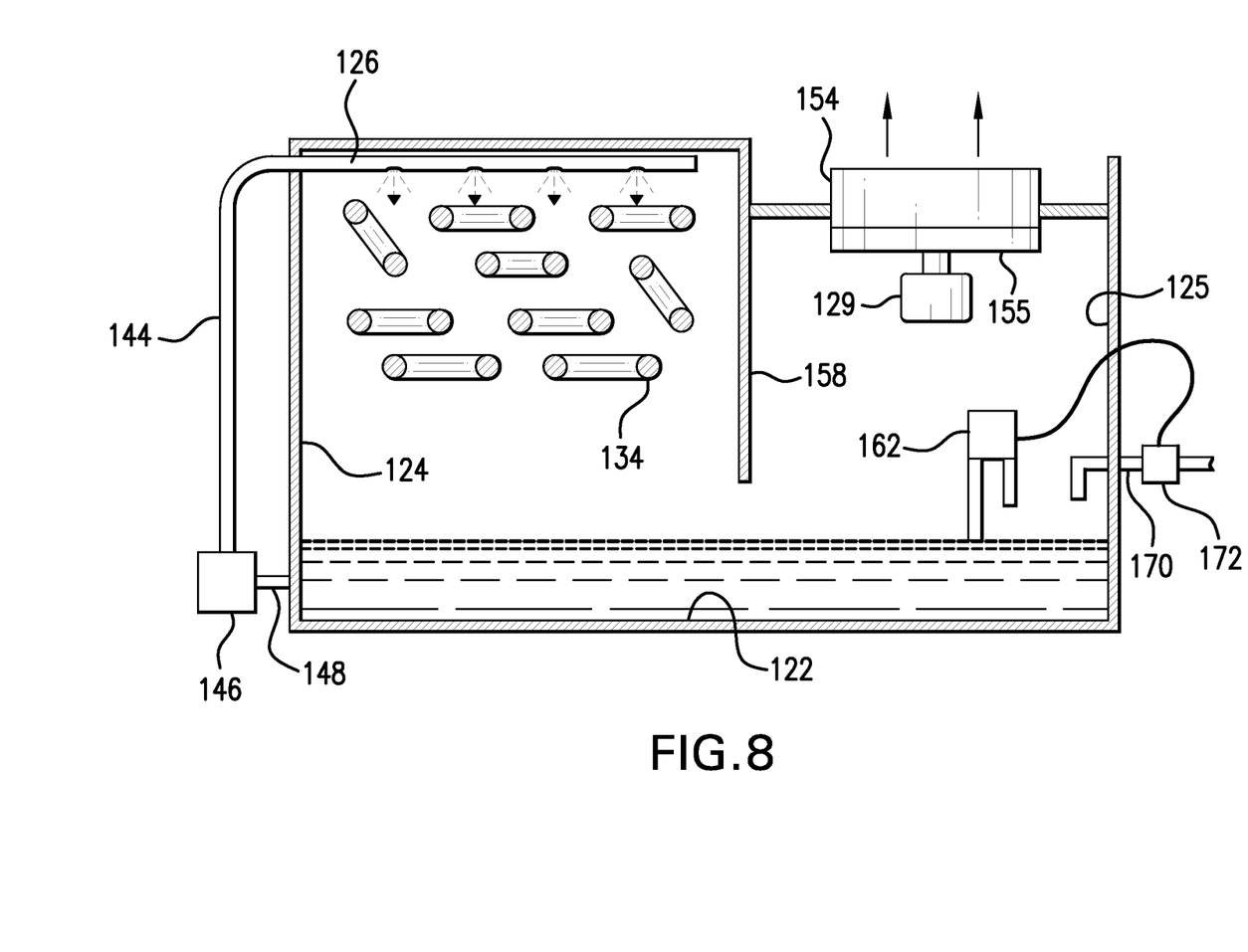
FIG. 8 is a cutaway side view of the evaporation unit shown in FIG. 7, taken along lines 8-8 shown in FIG. 7.

FIGS. 7 and 8 are a top view and a cutaway side view, respectively, of an evaporation unit 120 according to another embodiment of the present teachings. Evaporation unit 120 comprises a sprayer assembly 126, a heat transfer coil 134, a brine tank 122, an evaporation chamber 124, and a vapor return chamber 125. A fan 155, powered by a fan motor 129 and shielded by a fan shield 154, is provided at the top of vapor return chamber 125. An intermediate wall 158 divides vapor return chamber 125 from evaporation chamber 124.

As shown in FIG. 8, a pump 146 is provided to return treated wastewater and/or brine through a return line 148 for the purpose of pumping the treated wastewater and/or brine through a treated water supply line 144 to sprayer assembly 126. A float valve 162 can be provided to ensure that the level of treated wastewater and/or brine in brine tank 122 does not raise to a level where it would touch immediate wall 158. Float valve 162 can be in operative communication with a treated wastewater supply line 170 and can provide an electrical signal to a pump and valve unit 172 for the purpose of signaling when treated wastewater supply line 170 should be made to supply additional treated wastewater to brine tank 122.

Figure 9A:
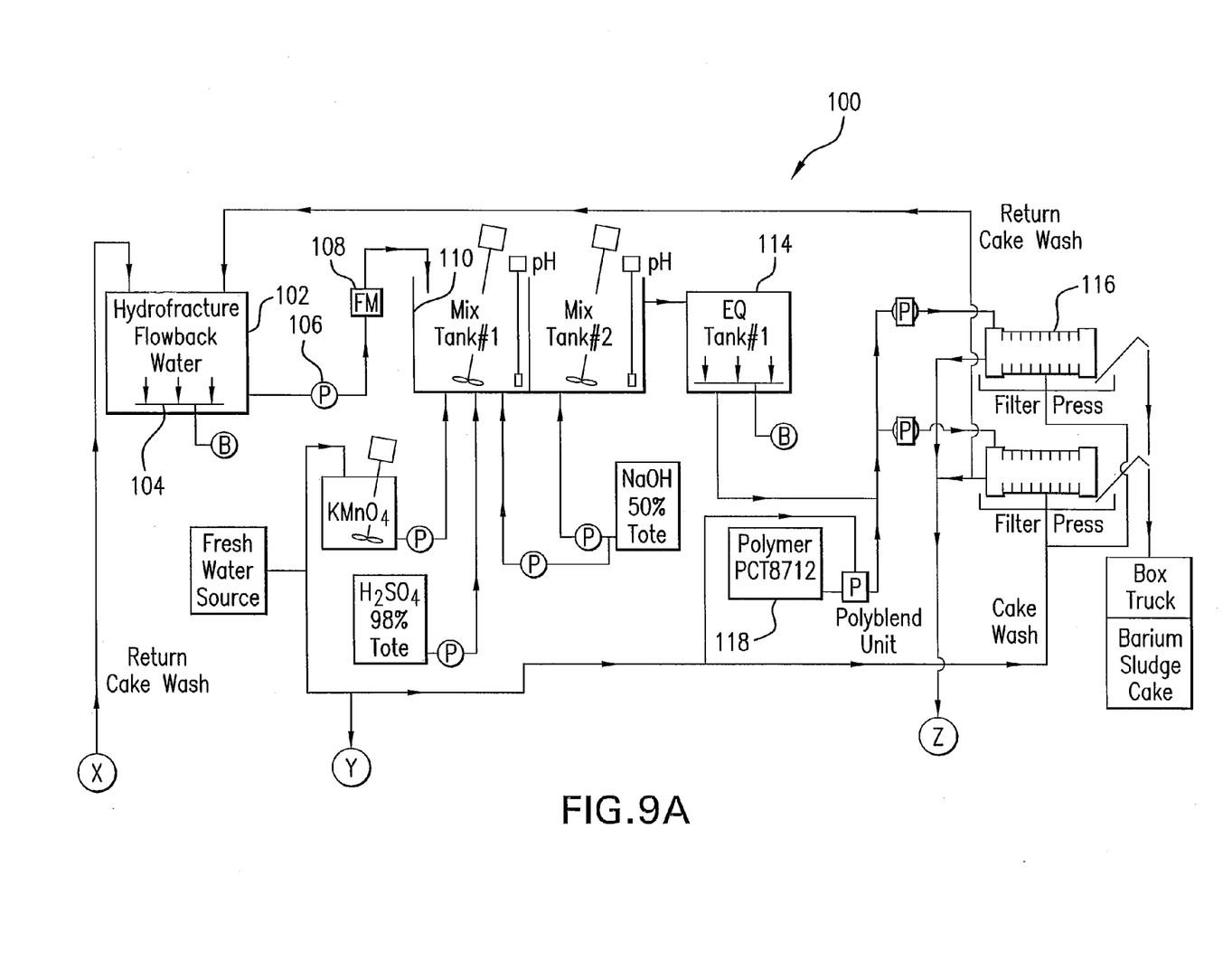
FIGS. 9A and 9B are the top and bottom, respectively, of a schematic flow diagram of an exemplary wastewater treatment system according to various embodiments of the present teachings, wherein flow line X shown in FIG. 9A is a continuation of flow line X shown in FIG. 9B, flow line Y shown in FIG. 9B is a continuation of flow line Y shown in FIG. 9A, and flow line Z shown in FIG. 9B is a continuation of flow line Z shown in FIG. 9A.
Figure 9B:
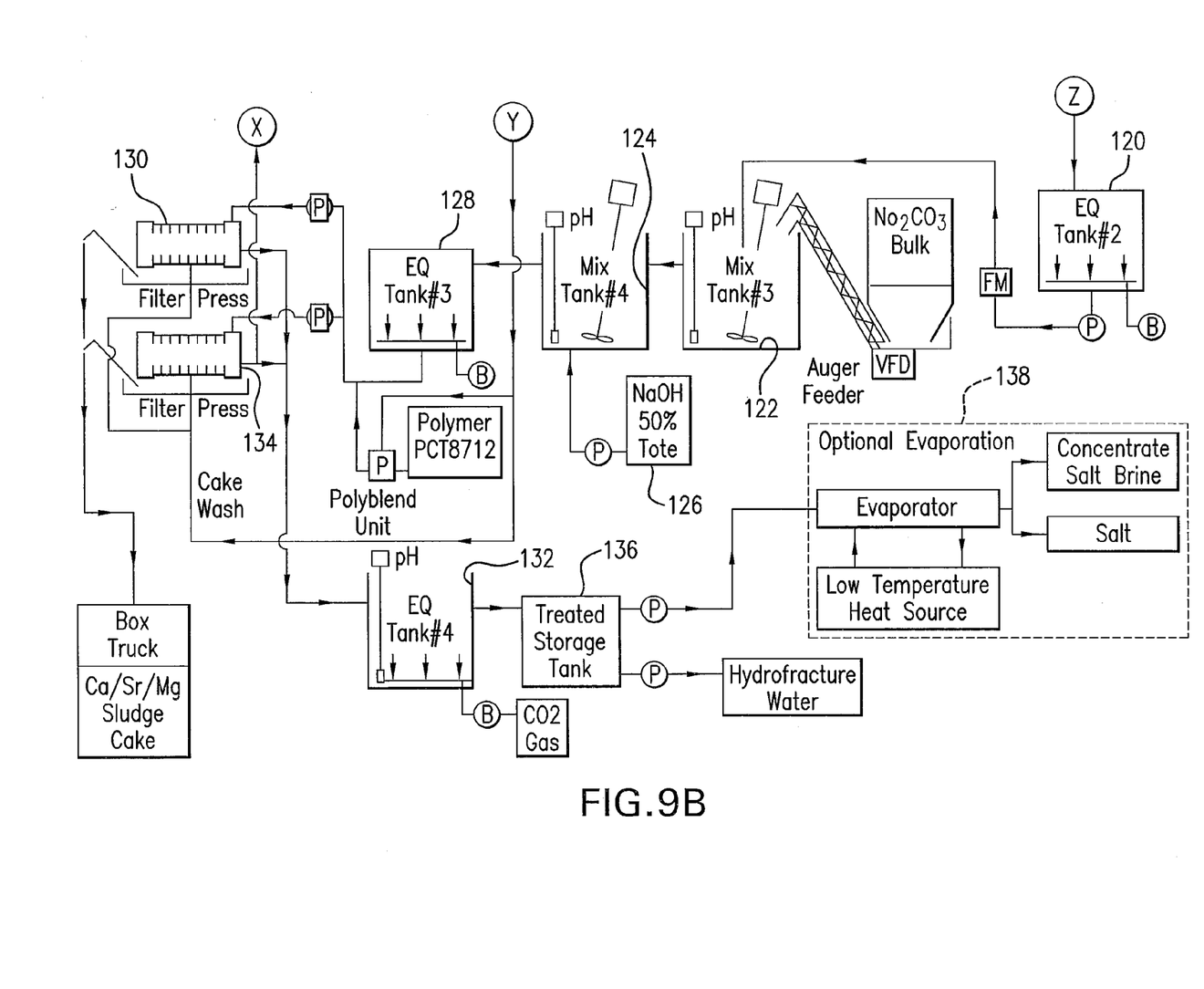

With reference to FIGS. 9A and 9B, according to various embodiments of the present teachings, gas well hydrofracture wastewater can be delivered for treatment to a fixed or mobile treatment process unit 100. Delivery can be by tank truck, railcar, directly from a gas well, or pumping from a wastewater containment area, for example, near a gas production well. The wastewater can be accumulated in an equalization tank 102 that is of sufficient volume to retain a volume equal to at least 8 hours of operation at the designed wastewater throughput of the treatment process. This tank can be equipped with an aeration system 104 to maintain aerobic conditions in the contained wastewater at all times.

The wastewater can be transferred from equalization tank 102 at a fixed flow rate by a pump 106, flow measurement device 108, and/or flow control device, to a first process tank 110. Positive displacement pumps such as a progressive cavity pump equipped with a variable frequency drive, can be used. Exemplary flow rates are from 5 to 2000 gallons per minute (gpm), for example, from 10 to 1500, from 100 to 1000, or from 20 to 500 gpm. Abandoned coal mine drainage (AMD) can be added to the fixed flow of wastewater at ratios of from 1:1 to 1:10, or from 1:3 to 1:4, for co-treatment. Use of AMD can reduce or eliminate the amount of sulfate ion to be added to the first process tank for barium sulfate precipitation. First process tank 110 can provide, for example, 5 minutes of retention time at the determined fixed flow rate and can have a high rate of mixing, for example, defined as a power input of at least 10 horsepower (hp) per 1000 gallons capacity. The mixer can be a high speed mixer, for example, having an rpm of greater than 400 rpm. Furthermore, first process tank 110 can be designed to dimensions such that it can have a "square" cross-section when viewed.

Chemicals that can be added to first process tank 110 can include potassium permanganate, sulfuric acid, and sodium hydroxide. Chemical additions can be in amounts sufficient to maintain the wastewater in an oxidized condition and within the pH range of from 3.0 to 3.5. Sufficient sulfate ion can be added to precipitate at least 50%, at least 75%, at least 90%, at least 95%, or all of the barium in the wastewater, as barium sulfate. Wastewater from first process tank 110 can be made to flow by gravity to a first process equation tank 114 and provide approximately 50 minutes retention time at a desired flow rate.

From first process equalization tank 114, the pH-adjusted wastewater can be pumped to a first chalked and gasketed plate and frame filter press 116 at flow rates from twice to less than 10% of the design flow rate. In the pump line from tank 114 to filter press 116, a diluted, for example, to 0.2% to 0.5% by weight, anionic polymer such as PCT 8712 available from ProChemTech International, Inc., Brockway, Pa., can be added from a supply tank 118 to flocculate the precipitates produced in the previous two process steps. Filter press 116 can remove the precipitates, including barium sulfate and other materials, for example, iron and manganese. Removal can be in the form of a solid sludge cake comprising from 25% to 65% solids, for example, 40% solids. The clear liquid filtrate can be discharged from filter press 116 into a second process equalization tank 120 to provide approximately 60 minutes of retention time.

The filtrate in second process equalization tank 120 can be pumped to a third mix tank 122 to provide a retention time of 5 minutes at a desired flow rate. Sodium carbonate can be automatically added to third mix tank 122 as a dry powder to raise the pH of the wastewater to within a range of from 9.5 to 10.5. Under these reaction conditions, calcium precipitates as calcium carbonate and a substantial portion of any strontium present precipitates as strontium carbonate. The treated wastewater can then be pH-adjusted in a fourth mix tank 124, for example, by adding sodium hydroxide from a source tank 126. The pH-adjusted wastewater can then be made to flow by gravity into an aerated third equalization tank 128 to provide approximately 60 minutes of retention time.

From third process equalization tank 128, the pH-adjusted wastewater can be pumped to a second chalked and gasketed plate and frame filter press 130 at a flow rate of from twice to less than 10% of the desired flow rate. In the pump line from tank 128 to filter press 130, a diluted anionic polymer such as PCT 8712, for example, diluted to from 0.2% to 0.5% by weight, can be added to flocculate the precipitates produced in the previous process step. Filter press 130 can remove the precipitates, including mixed calcium and strontium carbonate, as a solid sludge cake comprising from 25% to 65% solids, for example, about 40% solids. Clear liquid discharged from filter press 130 can be directed into an aerated fourth process equalization tank 132 to provide approximately 60 minutes of retention time.

The clear, filtered wastewater from fourth process equalization tank 132 can be pumped to fourth mix tank 124 to provide a retention time of 5 minutes at the desired flow rate of the system. Sodium hydroxide solution, for example, at 50% by weight, can be automatically added to fourth mix tank 124 to raise the pH of the wastewater to within a range of from 11.5 to 13.5. Under these reaction conditions, magnesium can be precipitated as magnesium hydroxide and any remaining strontium can be precipitated as strontium hydroxide. The pH-adjusted wastewater can then be made to flow by gravity into aerated fourth equalization tank 132, or into a fifth equalization tank (not shown), to provide approximately 60 minutes of retention time.

From third process equalization tank 128 or an optional fifth process tank (not shown), the pH-adjusted wastewater can be pumped to filter press 130 or to a third chalked and gasketed plate and frame filter press 134, for example, at a flow rate of from twice to less than 10% of the desired flow rate. In the pump line from the third or fifth process equalization tank to the filter press 130 or 134, a diluted anionic polymer such as PCT 8712, for example, to 0.2% to 0.5% by weight, can be added to flocculate the precipitates produced in the previous process step. Filter press 134 can remove the precipitates, including mixed magnesium and strontium hydroxides, as a solid sludge cake comprising from 25% to 65% solids, for example, 40% solids. Clear liquid discharged from the filter press can be directed into fourth equalization tank 132 to provide approximately 10 minutes of retention time.

In fourth equalization tank 132, carbon dioxide gas can be automatically added, for example, via diffusers, to the clear, treated wastewater to reduce the pH to within the range of from 6.5 to 8.5. The pH-adjusted, clarified wastewater can then be discharged by gravity into a clear water storage tank 136 for use or to be stored until subject to evaporation. Use can comprise use as a hydrofracture makedown water.

According to various embodiments, if the co-treatment of AMD is used and/or the hydrofracture wastewater has low levels of barium, calcium, magnesium, and strontium, the process filter presses can be replaced by inclined plate clarifiers. In some embodiments, inclined plate clarifiers can be used if the suspended solids level of the treated wastewaters exiting the first, second, or third process equalization tanks is less than 0.5% by weight. In such cases, the process equalization tanks can be eliminated from the process as process clarifiers would flow by gravity. A sludge holding tank can be provided for each process clarifier to retain the sludge removed on an automatic basis, for example, using positive displacement pumps. In some embodiments, three separate dewatering filter presses can be provided, one for each sludge stream. The dewatering filter presses can be fed by positive displacement pumps from the sludge holding tanks. Filtered waters can be returned, for example, to the system equalization tank and/or used as recycle hydrofracture water. Evaporation can be accomplished by utilizing one or more evaporation units 138 as shown and described with reference to FIGS. 1-8 herein.

EXAMPLES

The wastewater treatment system and process described with reference to FIGS. 9A and 9B were used on three different Marcellus hydrofracture flowback waters and provided the before and after treatment results shown in TABLES 3-5 below.

TABLE 3

Marcellus flowback water sample - low dissolved solids

| Parameter | untreated | treated |
|---|---|---|
| barium mg/l | 2,300 | <0.1 |
| calcium mg/l | 5,140 | 6.0 |
| iron mg/l | 11.2 | 0.04 |

TABLE 3-continued

Marcellus flowback water sample - low dissolved solids

| Parameter | untreated | treated |
|---|---|---|
| magnesium mg/l | 438 | 1.09 |
| manganese mg/l | 1.9 | <0.04 |
| strontium mg/l | 1,390 | 45.8 |
| total hardness mg/l as CaCO3 | 17,941 | 71.8 |
| total dissolved solids mg/l | 69,640 | 57,660 |

TABLE 4

Marcellus flowback water sample - moderate dissolved solids

| Parameter | untreated | treated |
|---|---|---|
| barium mg/l | 3,310 | <0.1 |
| calcium mg/l | 14,100 | 7.25 |
| iron mg/l | 52.5 | 1.7 |
| magnesium mg/l | 938 | 1.6 |
| manganese mg/l | 5.17 | <0.04 |
| strontium mg/l | 6,830 | 10.4 |
| total hardness mg/l as CaCO3 | 49,416 | 39.6 |
| total dissolved solids mg/l | 175,268 | 59,850 |

TABLE 5

Marcellus flowback water sample - high dissolved solids

| Parameter | untreated | treated |
|---|---|---|
| barium mg/l | 4,300 | <0.1 |
| calcium mg/l | 31,300 | 2.15 |
| iron mg/l | 134.1 | 1.60 |
| magnesium mg/l | 1,630 | 1.10 |
| manganese mg/l | 7.0 | 0.14 |
| strontium mg/l | 2,000 | 1.60 |
| total hardness mg/l as CaCO3 | 906,337 | 14.9 |
| total dissolved solids mg/l | 248,428 | 150,520 |

The two sludges produced by the treatment of the Marcellus flowback water sample shown in Table 5 were analyzed. The analysis used the USEPA TCLP leachate test procedure of Analytical Services, specifically, procedure PADEP #33-00411, ISO #1807.01. The USEPA TCLP leachate test requires a preliminary alkalinity determination of each sludge before each sludge is analyzed. Based on whether the sludge has low alkalinity or high alkalinity, extraction fluid USEPA 1 or USEPA 2 is used. The first sludge produced according to the procedure, referred to herein as the barium sludge, exhibited low alkalinity and thus extraction fluid 1 was used. The second sludge, referred to herein as the calcium/strontium/magnesium sludge, exhibited high alkalinity and thus extraction fluid 2 was used. The results of testing done on the sludges is shown in Table 6 below.

TABLE 6

Sludge Analyses

| TCLP parameter | barium sludge | calcium/strontium/magnesium sludge |
|---|---|---|
| arsenic | 0.106 mg/l | 0.0533 mg/l |
| barium | 0.465 | 0.660 |
| cadmium | <0.005 | <0.005 |
| chromium | 0.0236 | 0.0239 |
| lead | <0.020 | <0.020 |
| mercury | <0.0002 | <0.0002 |
| selenium | 0.402 | 0.199 |

TABLE 6-continued

Sludge Analyses

| TCLP parameter | barium sludge | calcium/strontium/magnesium sludge |
|---|---|---|
| silver | <0.010 | <0.010 |
| pH initial | 7.12 | 10.4 |
| pH final | 4.85 | 6.85 |
| extraction fluid used | USEPA 1 | USEPA 2 |

As can be seen from Table 6 above, both the barium sludge and the calcium/strontium/magnesium sludge are non-hazardous according to the USEPA TCLP procedure used to test them.

Other embodiments of the present teachings will be apparent to those skilled in the art from consideration of the present specification and practice of the present teachings disclosed herein. It is intended that the present specification and examples be considered exemplary only.

What is claimed is:

1. A liquid comprising a gas well hydrofracture wastewater comprising barium, and an amount of coal mine water comprising sulfate ions, the coal mine water being selected from abandoned coal mine water and coal mine discharge water, wherein the amount of coal mine water in the liquid is sufficient to provide enough sulfate ions to precipitate at least 90% of the barium in the gas well hydrofracture wastewater.

2. The liquid of claim 1, disposed in a gas well hydrofracture.

3. The liquid of claim 1, wherein the gas well hydrofracture wastewater comprises a Marcellus flowback water.

4. The liquid of claim 1, wherein the coal mine water comprises coal mine discharge water.

5. The liquid of claim 1, wherein the coal mine water comprises abandoned coal mine water.

6. The liquid of claim 5, wherein the ratio of gas well hydrofracture wastewater to coal mine water is respectively from 1:10 to 1:1.

7. The liquid of claim 5, wherein the ratio of gas well hydrofracture wastewater to coal mine water is respectively from 1:3 to 1:4.

8. A method comprising:
mixing together gas well hydrofracture wastewater comprising barium, and an amount of coal mine water comprising sulfate ions, the coal mine water being selected from abandoned coal mine water and coal mine discharge water, wherein the amount of coal mine water mixed with the gas well hydrofracture wastewater is an amount sufficient to provide enough sulfate ions to precipitate at least 90% of the barium present in the gas well hydrofracture wastewater.

9. The method of claim 8, further comprising precipitating at least 90% of the barium in the gas well hydrofracture wastewater.

10. The method of claim 8, further comprising forming a fixed flow of the gas well hydrofracture wastewater, wherein the mixing comprises adding the coal mine water to the fixed flow of gas well hydrofracture wastewater.

11. The method of claim 10, wherein the coal mine water comprises abandoned coal mine water and the amount of coal mine water added to the fixed flow of gas well hydrofracture wastewater is at a respective ratio of from 1:1 to 1:10.

12. The method of claim 10, wherein the coal mine water comprises abandoned coal mine water and the amount of coal mine water added to the fixed flow of gas well hydrofracture wastewater is at a respective ratio of from 1:3 to 1:4.

13. The method of claim 8, wherein the mixing occurs within a gas well hydrofracture.

14. The method of claim 8, wherein the gas well hydrofracture wastewater comprises a Marcellus flowback water.

15. The method of claim 8, wherein the coal mine water comprises abandoned coal mine water.

16. The method of claim 8, wherein the coal mine water comprises coal mine discharge water.

17. The method of claim 8, wherein the mixing results in a treated wastewater, and the method further comprises:

precipitating barium sulfate from the treated wastewater; and filtering the precipitated barium sulfate from the treated wastewater.

18. The method of 17, wherein the filtering comprises filtering on an inclined plate clarifier.

\* \* \* \* \*